United States Patent
Rui et al.

(10) Patent No.: US 12,321,638 B2
(45) Date of Patent: Jun. 3, 2025

(54) COMPRESSION ACCELERATOR CARD AND METHOD OF SIMULATING HARD DISK MODE TO ACCESS THE COMPRESSION ACCELERATOR CARD

(71) Applicant: INNOGRIT TECHNOLOGIES CO., LTD., Shanghai (CN)

(72) Inventors: Xiaoli Rui, Shanghai (CN); Yuan-mao Chang, Shanghai (CN); Gang Hu, Shanghai (CN); Zining Wu, Shanghai (CN)

(73) Assignee: INNOGRIT TECHNOLOGIES CO., LTD., Shanghai (CN)

( * ) Notice: Subject to any disclaimer, the term of this patent is extended or adjusted under 35 U.S.C. 154(b) by 18 days.

(21) Appl. No.: 18/154,434

(22) Filed: Jan. 13, 2023

(65) Prior Publication Data
US 2024/0241667 A1    Jul. 18, 2024

(51) Int. Cl.
*G06F 3/06* (2006.01)

(52) U.S. Cl.
CPC ............ *G06F 3/0659* (2013.01); *G06F 3/064* (2013.01); *G06F 3/0679* (2013.01); *G06F 3/0604* (2013.01)

(58) Field of Classification Search
CPC ...... G05B 13/00–048; G05B 15/00–02; G05B 17/00–02; G06F 1/00–3296;
(Continued)

(56) References Cited

U.S. PATENT DOCUMENTS

| | | | | |
|---|---|---|---|---|
| 5,329,318 A | * | 7/1994 | Keith | H04N 19/61 348/699 |
| 5,426,462 A | * | 6/1995 | Bui | H04N 19/61 375/E7.093 |

(Continued)

OTHER PUBLICATIONS

NVMe Based Reconfigurable Compression Engine; David Sloan, EIDETICOM; Flash Memory Summit 2018; 2018; retrieved from https://files.futurememorystorage.com/proceedings/2018/20180808_NVME-202-2_Sloan.pdf on Apr. 24, 2024/ (Year: 2018).*

(Continued)

*Primary Examiner* — Daniel C. Chappell
(74) *Attorney, Agent, or Firm* — HSML P. C.

(57) ABSTRACT

This application discloses a compression accelerator card, method of simulating hard disk mode to access the compression accelerator card. The method comprises: setting a compression identifier and sending a write command to a virtual compression hard disk by an application, and the write command is sent to a compression accelerator card via the virtual compression hard disk; compressing data by the compression accelerator card according to the compression identifier and caching the compressed data within the compression accelerator card, and returning a message to the application; setting a decompression identifier and sending a read command to the virtual compression hard disk by the application, the read command is sent to the compression accelerator card via the virtual compression hard disk, wherein the logical address corresponding to the read command is the same as the write command; and not decom- (Continued)

pressing the compressed data according to the decompression identifier by the compression accelerator card, and returning the compressed data to the application by the virtual compression hard disk. This application reduces CPU usage, minimizes changes to supporting software brought by migration from CPU compression to hardware compression, and reduces enterprise equipment cost.

6 Claims, 4 Drawing Sheets

(58) Field of Classification Search
CPC ............... G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 2225/00–1094; H03M 7/00–707; H04L 9/00–38; H04L 12/00–66; H04L 41/00–5096; H04L 49/00–9094; H04L 61/00–59; H04L 67/00–75
See application file for complete search history.

(56) References Cited

U.S. PATENT DOCUMENTS

| | | | | |
|---|---|---|---|---|
| 5,555,433 | A * | 9/1996 | Nguyen | G06F 13/364 |
| | | | | 710/100 |
| 9,612,749 | B2 * | 4/2017 | Wang | G06F 3/067 |
| 9,940,293 | B1 * | 4/2018 | Desai | G06F 13/426 |
| 10,476,518 | B1 * | 11/2019 | Chang | H03M 7/3088 |
| 11,115,049 | B1 * | 9/2021 | Chang | H03M 7/6017 |
| 11,119,685 | B2 * | 9/2021 | Anand | G06F 3/0673 |
| 2005/0104753 | A1 * | 5/2005 | Dror | H03M 7/3086 |
| | | | | 341/51 |
| 2005/0210476 | A1 * | 9/2005 | Wu | G06F 9/441 |
| | | | | 719/310 |
| 2006/0280241 | A1 * | 12/2006 | Weston | G10L 19/00 |
| | | | | 375/240 |
| 2007/0109153 | A1 * | 5/2007 | Ma | H03M 7/40 |
| | | | | 341/50 |
| 2008/0021694 | A1 * | 1/2008 | Petikian | G11B 19/048 |
| 2012/0262314 | A1 * | 10/2012 | Carlson | H03M 7/607 |
| | | | | 341/87 |
| 2014/0343917 | A1 * | 11/2014 | Shao | G06F 13/105 |
| | | | | 703/21 |
| 2015/0010143 | A1 * | 1/2015 | Yang | G06F 3/068 |
| | | | | 380/28 |
| 2015/0169484 | A1 * | 6/2015 | Lu | G06F 13/385 |
| | | | | 710/14 |
| 2015/0178105 | A1 * | 6/2015 | Graham | G06F 9/45558 |
| | | | | 718/1 |
| 2016/0004451 | A1 * | 1/2016 | Lakshman | G06F 3/0664 |
| | | | | 711/162 |
| 2022/0269431 | A1 * | 8/2022 | Ren | G06F 3/0641 |
| 2022/0346243 | A1 * | 10/2022 | Zhang | H05K 5/0069 |
| 2022/0405143 | A1 * | 12/2022 | Kelkar | G06F 9/505 |
| 2022/0413704 | A1 * | 12/2022 | Mistry | G06F 9/3887 |
| 2024/0134527 | A1 * | 4/2024 | Ray | G06F 3/0679 |

OTHER PUBLICATIONS

Programming Intel® QuickAssist Technology Hardware Accelerators for Optimal Performance White Paper; Intel; Apr. 2015; retrieved from https://web.archive.org/web/20210225161824/https://01.org/sites/default/files/page/332125_002_0.pdf on Apr. 24, 2024 (Year: 2015).*

Reduce Storage Occupancy and Increase Operations Efficiency with IBM zEnterprise Data Compression; Bruni et al.; Feb. 2015; retrieved from https://www.redbooks.ibm.com/redbooks/pdfs/sg248259.pdf on Sep. 20, 2024 (Year: 2015).*

Return compressed response from worker; Cloudflare; Mar. 2020; retrieved from https://community.cloudflare.com/t/return-compressed-response-from-worker/154117 on Sep. 20, 2024 (Year: 2020).*

W. M. Davis et al., "Software Strategies and Hardware Upgrades to the PPL Data Acquisition System (DAS)," in IEEE Transactions on Nuclear Science, vol. 34, No. 4, pp. 775-781, Aug. 1987, doi: 10.1109/TNS.1987.4334735. (Year: 1987)*

* cited by examiner

COMPRESSION ACCELERATOR CARD AND METHOD OF SIMULATING HARD DISK MODE TO ACCESS THE COMPRESSION ACCELERATOR CARD

TECHNICAL FIELD

This disclosure relates to the technical field of data compression, and more specifically to a method of simulating hard disk mode to access a compression accelerator card based on data intelligent processing technology, and a compression accelerator card.

BACKGROUND

In current market, in data centers, enterprise private clouds, game platforms, storage servers, and other occasions that involve big data compression and transmission, most of them rely on CPU compression algorithms. Using CPU to compress data occupies considerable CPU resources, and the cost of CPU resources is relatively high, and many occupations will be detrimental to the rapid growth of the enterprise market in the future. Therefore, the PCIe compression accelerator card based on hardware acceleration comes into being, which can greatly reduce CPU resources occupation while ensure compression performance. However, directly using the PCIe compression accelerator card, users need to develop many supporting software to access the PCIe compression accelerator card.

SUMMARY OF THE INVENTION

An object of the application is to provide a method of simulating hard disk mode to access a compression accelerator card based on data intelligent processing technology, which can reduce the CPU usage, and minimize the changes to the supporting software brought by the user's migration from CPU compression to hardware compression, and reduce enterprise equipment cost.

This application discloses a method of simulating hard disk mode to access a compression accelerator card based on data intelligent processing technology, the method may comprise:
  setting a compression identifier and sending a write command to a virtual compression hard disk by an application, and the write command is sent to a compression accelerator card via the virtual compression hard disk;
  compressing data by the compression accelerator card according to the compression identifier and caching the compressed data within the compression accelerator card, and returning a message to the application;
  setting a decompression identifier and sending a read command to the virtual compression hard disk by the application, the read command is sent to the compression accelerator card via the virtual compression hard disk, wherein the logical address corresponding to the read command is the same as the write command; and
  not decompressing the compressed data according to the decompression identifier by the compression accelerator card, and returning the compressed data to the application by the virtual compression hard disk.

In same embodiments, the compression identifier is added to the write command and sent to the virtual compression hard disk, and the decompression identifier is added to the read command and sent to the virtual compression hard disk.

In same embodiments, the compression identifier and the decompression identifier are respectively arranged in a register of the compression accelerator card.

In same embodiments, before the step of setting the compression identifier and sending the write command to the virtual compression hard disk by the application, the method further comprises:
  inserting a compression accelerator card into a host; and
  loading a hard disk driver and an application, and successfully detecting a virtual compression hard disk by the host.

In same embodiments, the hard disk driver is an NVMe driver.

In same embodiments, logical addresses of all input/output interfaces of the compression accelerator card are based on 32K alignment.

This application also discloses a method for accessing a compression accelerator card based on data intelligent processing technology to simulate hard disk mode, the method may comprise:
  setting a compression identifier and sending a write command to a virtual compression hard disk by an application, and the write command is sent to a compression accelerator card via the virtual compression hard disk;
  not compressing data by the compression accelerator card according to the compression identifier and caching previous compressed data within the compression accelerator card, and returning a message to the application;
  setting a decompression identifier and sending a read command to the virtual compression hard disk by the application, the read command is sent to the compression accelerator card via the virtual compression hard disk, wherein the logical address corresponding to the read command is the same as the write command; and
  decompressing the previous compressed data according to the decompression identifier by the compression accelerator card, and returning the decompressed data to the application.

In same embodiments, the compression identifier is added to the write command and sent to the virtual compression hard disk, and the decompression identifier is added to the read command and sent to the virtual compression hard disk.

In same embodiments, the compression identifier and the decompression identifier are respectively arranged in a register of the compression accelerator card.

In same embodiments, the hard disk driver is an NVMe driver.

In same embodiments, before the step of setting the compression identifier and sending the write command to the virtual compression hard disk by the application, the method further comprises:
  inserting a compression accelerator card into a host; and
  loading a hard disk driver and an application, and successfully detecting a virtual compression hard disk by the host.

In an embodiment, logical addresses of all input/output interfaces of the compression accelerator card are based on 32K alignment.

This application also discloses a compression accelerator card, the compression accelerator card may comprise:
  a hard disk protocol interface module, when the compression accelerator card is inserted into a host and queried by the host, the compression accelerator card is detected as a virtual compression hard disk, and the hard disk protocol interface module is configured to report hard disk properties;

a storage module, configured to store compressed or decompressed data, and the hard disk protocol interface module is configured to report the capacity of the storage module as the capacity of the hard disk; and a compression engine, the compression engine has a mapping relationship between logical block addresses on the host side and physical block addresses on the virtual compression hard disk side.

In same embodiments, the hard disk properties comprise a hard disk block size, modes of accessing the virtual hard disk, and a logical block size supported by input/output interfaces.

In the implementation of the present application, PCIe compression accelerator card scheme designed based on DIPU to simulate compression hard disk mode aims to provide a hardware-based acceleration compression card scheme for each scenario that requires compression data transmission, which reduces CPU usage and enterprise equipment cost, minimizes changes in supporting software caused by user's migration from CPU compression to hardware compression.

A large number of technical features are described in the specification of the present application, and are distributed in various technical solutions. If a combination (i.e., a technical solution) of all possible technical features of the present application is listed, the description may be made too long. In order to avoid this problem, the various technical features disclosed in the above summary of the present application, the technical features disclosed in the various embodiments and examples below, and the various technical features disclosed in the drawings can be freely combined with each other to constitute various new technical solutions (all of which are considered to have been described in this specification), unless a combination of such technical features is not technically feasible. For example, feature A+B+C is disclosed in one example, and feature A+B+D+E is disclosed in another example, while features C and D are equivalent technical means that perform the same function, and technically only choose one, not to adopt at the same time. Feature E can be combined with feature C technically. Then, the A+B+C+D scheme should not be regarded as already recorded because of the technical infeasibility, and A+B+C+E scheme should be considered as already documented.

DETAILED DESCRIPTION

In the following description, numerous technical details are set forth in order to provide the reader with a better understanding of the present application. However, those skilled in the art can understand that the technical solutions claimed in the present application can be implemented without these technical details and various changes and modifications based on the following embodiments.

Explanation of Some Concepts:

DIPU: DATA Intelligently Processing Unit technology. The technology mainly introduces data intelligent processing on the disk based on the traditional hard disk host controller design, such as encryption, authorized access, compression, hot and cold data analysis and so on. When a user stores or accesses the hard disk data, the user may use the data after the application intelligently processes the user data.

PCIe (peripheral component interconnect express): high speed serial computer expansion bus standard.

Virtual compression hard disk: the host simulates the compression accelerator card as a compression hard disk and accesses the compression hard disk in the mode of accessing the hard disk.

The following is a summary of some of the innovations in the implementation of the application:

The present application provides a hardware accelerated based compression card scheme, i.e., PCIe compression accelerator card scheme designed based on DIPU, to simulate compression hard disk mode, which can reduce the CPU usage and the enterprise equipment cost. This scheme simulates the PCIe compression accelerator card as a DIPU compression hard disk. When the host side detects the PCIe compression accelerator card, the host system and software application may automatically recognize the DIPU compression hard disk. The host system and application only need to make very limited software changes for this virtual compression hard disk access, and can access the compression acceleration card as if they were accessing a normal hard disk. Take advantage of the excellent performance provided by the accelerator card, it can help customers compress data before data transmission and release CPU load. If the compressed data needs to be transmitted between network and terminal storage device, this scheme has excellent compatibility and adaptability close to the storage hard disk, and can also greatly reduce network load and increase the usage of the storage device.

In order to make the objects, technical solutions and advantages of the present application clearer, embodiments of the present application will be further described in detail below with reference to the accompanying drawings.

A first embodiment of the application relates to a method of simulating hard disk mode to access a compression accelerator card based on data intelligent processing technology; the method comprises the following steps:

Step 1, insert the compression accelerator card into the host.

Step 2, the host loads the hard disk driver and the application. It should be noted that in the traditional scheme which uses the CPU compression algorithm, an input buffer and an output buffer (host side) are arranged in the PCIe command, and the accelerator card obtains data from the input buffer, compresses it and output it into the output buffer, which makes a large change to the upstream software. However, the driver loaded in the application is a hard disk driver, not a PCIe adapter driver. For example, in one embodiment, the hard disk driver may be an NVMe driver.

Step 3, the host successfully detects the virtual compression hard disk. The host system and application only need to make very limited software changes for this virtual compression hard disk access, and can access the compression acceleration card as if they were accessing a normal hard disk. Take advantage of the excellent performance provided by the accelerator card, it can help the user compress data before data transmission and release CPU load.

Figure 1:
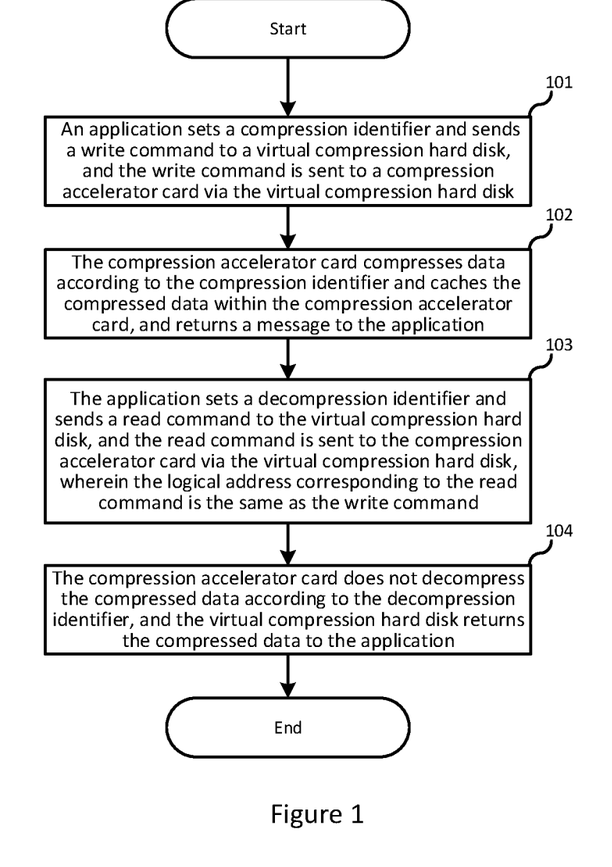
FIG. 1 is a flow diagram of a method of simulating hard disk mode to access a compression accelerator card based on data intelligent processing technology according to an embodiment of the present application.

Step 4, the host side application may compress the host side data by accessing the virtual compression hard disk. The compression operation process is shown in FIG. 1, which comprises the following steps:

Step 101, the application sets the compression identifier and sends a write command to the virtual compression hard disk, and the write command is sent to the compression accelerator card via the virtual compression hard disk. The compression identifier represents the identification of compressing data or not compressing data. In this embodiment, the compression identifier is set to compress data.

In one embodiment, the compression identifier is added to the write command and sent to the virtual compression hard disk. In another embodiment, the compression identifier is arranged in a register of the compression accelerator card.

Step 102, the compression accelerator card compresses data according to the compression identifier and caches the compressed data within the compression accelerator card, and returns a message to the hard disk driver and the application.

Step 103, the application sets the decompression identifier and sends a read command to the virtual compression hard disk, and the read command is sent to the compression accelerator card via the virtual compression hard disk, wherein the logical address corresponding to the read command is the same as the write command. The decompression identifier represents the identification of decompressing data or not decompressing data. In this embodiment, the decompression identifier set to not decompress data.

In one embodiment, the decompression identifier is added to the read command and sent to the virtual compression hard disk. In another embodiment, the decompression identifier is arranged in a register of the compression accelerator card.

Step 104, the compression accelerator card does not decompress the compressed data according to the decompression identifier, and the virtual compression hard disk returns the compressed data to the application.

Figure 2:
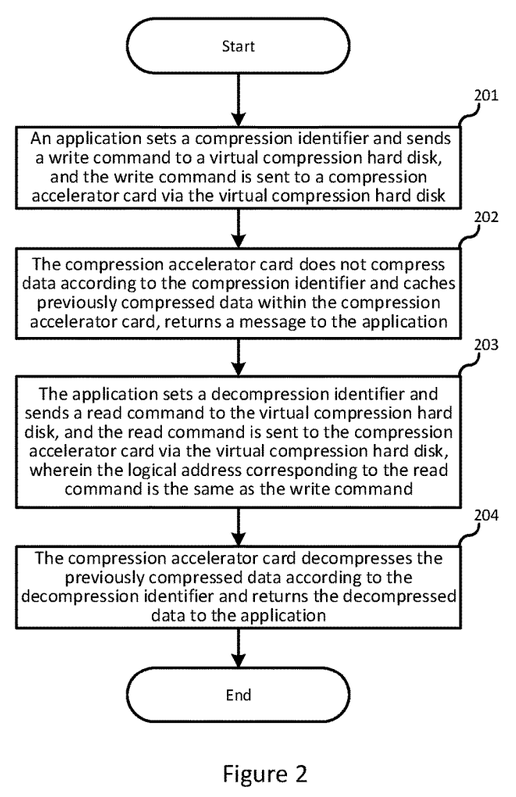
FIG. 2 is a flow diagram of a method of simulating hard disk mode to access a compression accelerator card based on data intelligent processing technology according to another embodiment of the present application.

Step 5, the host side application may decompress the host side data by accessing this virtual compression hard disk. The decompression operation process is shown in FIG. 2, which comprises the following steps:

Step 201, the application sets the compression identifier and sends a write command to the virtual compression hard disk, and the write command is sent to the compression accelerator card via the virtual compression hard disk. In this embodiment, the compression identifier is set to not compress data.

Step 202, the compression accelerator card does not compress data according to the compression identifier and caches previously compressed data within the compression accelerator card, and returns a message to the application.

Step 203, the application sets the decompression identifier and sends a read command to the virtual compression hard disk, and the read command is sent to the compression accelerator card via the virtual compression hard disk, wherein the logical address corresponding to the read command is the same as the write command. In this embodiment, the decompression identifier is set to decompress data.

Step 204, the compression accelerator card decompresses the previously compressed data according to the decompression identifier and returns the decompressed data to the application.

In one embodiment, the logical addresses of all input/output interfaces of the compression accelerator card are based on 32K alignment, which can obtain a better compression ratio.

In order to better understand the technical solutions of this specification, the following description will be given with a specific embodiment. The details listed in this embodiment are mainly for ease of understanding and are not intended to limit the scope of protection of this application.

Figure 3:
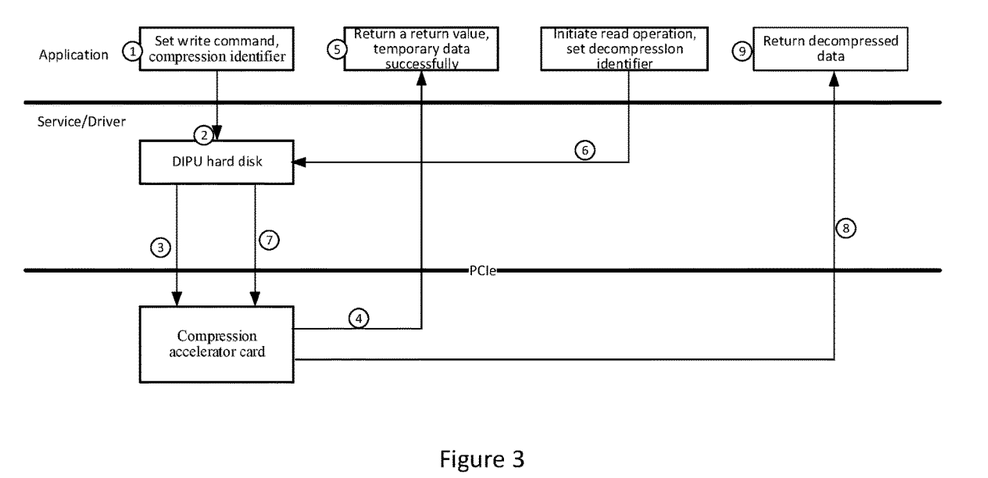
FIG. 3 is a process diagram of performing data compression by simulating hard disk mode to access a compression accelerator card according to an embodiment of the present application.

The PCIe compression accelerator card designed based on DIPU simulated compression hard disk may have two interface options: PCIe Gen4 and Gen5. The PCIe compression accelerator card is connected to the host through a PCIe slot, the host side loads the disk driver and the application, and successfully detects a virtual DIPU compression hard disk. The host side application can compress the host side test data by accessing the hard disk. FIG. 3 shows a specific compression operation process diagram based on the data intelligent processing technology to simulate the hard disk access to the compression accelerator card in one embodiment.

Step 1 : the application sets a compression identifier which represents not compressing data. The input data is previously compressed data. Send a write command to the DIPU hard disk.

Step 2 : the write command is sent to the hardware accelerator card through the DIPU hard disk driver.

Step 3 : after receiving data, the compression accelerator card not compresses the previously compressed data according to the identifier, and temporarily stores the previously compressed data within the compression accelerator card.

Step 4 : after the previously compressed data is temporarily stored, return a return value representing command success to the hard disk driver and the application.

Step 5 : the application receives the return value, the application sets a decompression identifier which represents decompressing data, and sends a read command. The LBA of the read command is set to the LBA corresponding to the write command in Step 1 to read the data.

Step 6 : the read command is sent to the hardware accelerator card through the DIPU hard disk driver.

Step 7 : after receiving the command, the compression accelerator card decompresses the previously compressed data according to the decompression identifier.

Step 8 : return the decompressed data to the application.

Step 9: the application receives the data decompressed by the hardware accelerator card, and the application determines how to use the decompressed data.

Figure 4:
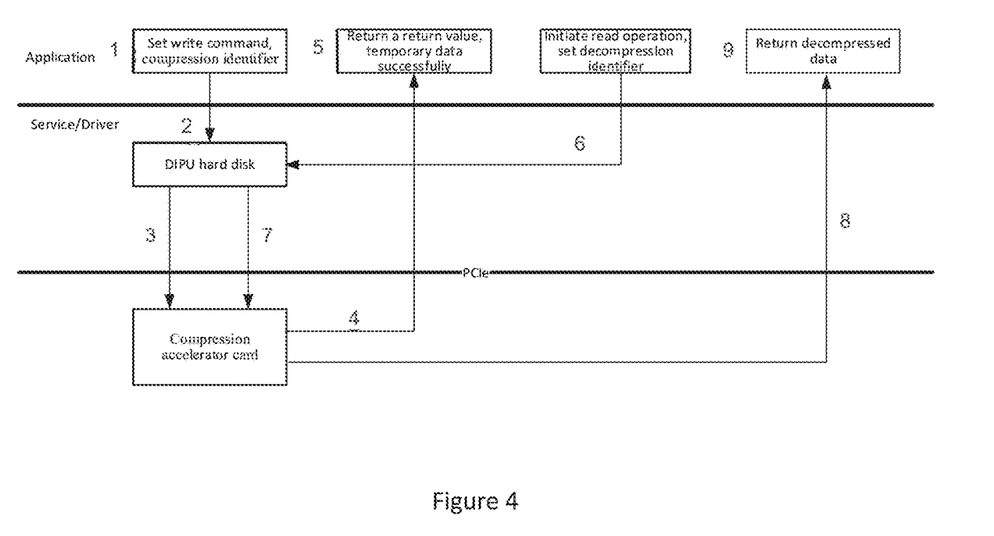
FIG. 4 is a process diagram of performing data decompression by simulating hard disk mode to access a compression accelerator card according to an embodiment of the present application.

FIG. 4 shows a specific decompression operation process diagram based on the data intelligent processing technology to simulate the hard disk access to the compression accelerator card in one embodiment.

Step①: the application sets a compression identifier which represents not compressing data. The input data is previously compressed data. Send a write command to the DIPU hard disk.

Step②: the write command is sent to the hardware accelerator card through the DIPU hard disk driver.

Step③: after receiving data, the compression accelerator card not compresses the previously compressed data according to the identifier, and temporarily stores the previously compressed data within the compression accelerator card.

Step④): after the previously compressed data is temporarily stored, return a return value representing command success to the hard disk driver and the application.

Step⑤: the application receives the return value, the application sets a decompression identifier which represents decompressing data, and sends a read command. The LBA of the read command is set to the LBA corresponding to the write command in Step① to read the data.

Step⑥: the read command is sent to the hardware accelerator card through the DIPU hard disk driver.

Step⑦: after receiving the command, the compression accelerator card decompresses the previously compressed data according to the decompression identifier.

Step⑧: return the decompressed data to the application.

Step⑨: the application receives the data decompressed by the hardware accelerator card, and the application determines how to use the decompressed data.

Figure 5:
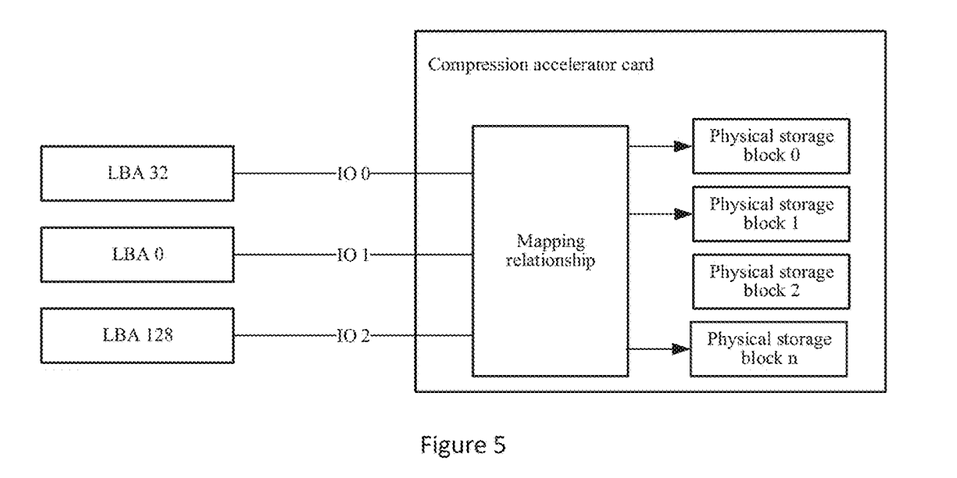
FIGS. 5 and 6 are mapping relationships between logical addresses to physical addresses at different time according to an embodiment of the present application.
Figure 6:
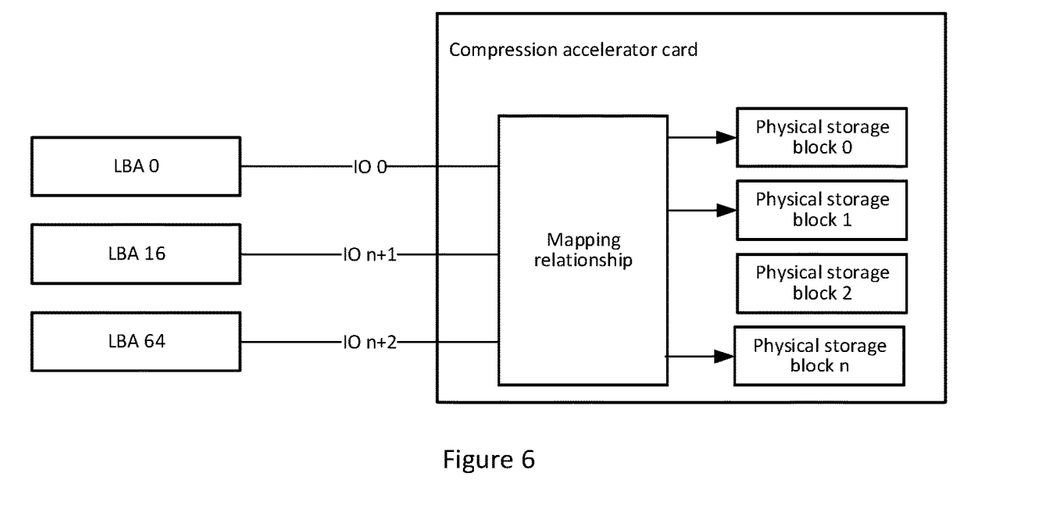

A second embodiment of the present application relates to a compression accelerator card, which comprises a hard disk protocol interface module, a storage module and a compression engine. When the compression accelerator card is inserted into the host and queried by the host, the compression accelerator card is detected as the virtual compression hard disk, and the hard disk protocol interface module reports the hard disk properties. In one embodiment, the hard disk properties comprise a hard disk block size, modes of accessing the virtual hard disk, and a logical block size supported by input/output interfaces. The storage module is configured to store compressed or decompressed data. The storage module may be DDR, SRAM or FLASH. The hard disk protocol interface module reports the capacity of the storage module as the capacity of the hard disk. The compression engine has a mapping relationship between logical block addresses on the host side and physical block addresses on the virtual compression hard disk side. FIG. 5 shows a mapping relationship between logical addresses and physical addresses in one embodiment of the present application, and FIG. 6 shows a mapping relationship between logical addresses and physical addresses after a period of time.

The first embodiment is a method embodiment corresponding to the present embodiment, and the technical details in the first embodiment can be applied to the present embodiment, and the technical details in the present embodiment can also be applied to the first embodiment.

It should be noted that in the application documents of the present application, relational terms such as first and second, and so on are only configured to distinguish one entity or operation from another entity or operation, and do not necessarily require or imply any such actual relationship or order between these entities or operations. Furthermore, the term "comprises" or "comprising" or "includes" or any other variations thereof is intended to encompass a non-exclusive inclusion, such that a process, method, article, or device that comprises a plurality of elements includes not only those elements but also Other elements, or elements that are inherent to such a process, method, item, or device. Without more restrictions, the element defined by the phrase "comprise a/an" does not exclude that there are other identical elements in the process, method, article or equipment that includes the element. In the application file of this application, if it is mentioned that an action is performed according to an element, it means the meaning of performing the action at least according to the element, and includes two cases: the behavior is performed only on the basis of the element, and the behavior is performed based on the element and other elements. Multiple, repeatedly, various, etc., expressions include 2, twice, 2 types, and 2 or more, twice or more, and 2 types or more types.

All documents mentioned in the disclosure are considered to be included in the disclosure of the disclosure as a whole, so that they can be used as a basis for modification when necessary. In addition, it should be understood that after reading the content of the present disclosure, those skilled in the art can make various changes or modifications to the present disclosure, and these equivalent forms also fall within the scope of protection claimed by the present disclosure.

In some cases, the actions or steps described in the claims can be performed in a different order than in the embodiments and still achieve desired results. In addition, the processes depicted in the drawings do not necessarily require the specific order or sequential order shown in order to achieve the desired results. In some embodiments, multitasking and parallel processing are also possible or may be advantageous.

What is claimed is:

1. A method of simulating hard disk mode to access a compression accelerator card based on data intelligent processing technology, comprising:

inserting the compression accelerator card into a host;

loading a hard disk driver and an application, not a PCIe adapter driver, and successfully detecting the compression accelerator card as a virtual compression hard disk by the host, the host accessing the compression accelerator card as if accessing a normal hard disk;

using the application to perform functions of setting a compression identifier and sending a write command to the virtual compression hard disk, and the write command is sent to a compression accelerator card via the virtual compression hard disk, the compression accelerator card is driven by the hard disk driver and detected as the virtual compression hard disk to the host;

compressing data by the compression accelerator card according to the compression identifier and caching the compressed data within the compression accelerator card, and returning a message to the application;

using the application to perform functions of setting a decompression identifier and sending a read command to the virtual compression hard disk, the read command is sent to the compression accelerator card via the virtual compression hard disk, wherein a logical address to be read by the read command is a same logical address as was used for the write command; and not decompressing the compressed data cached in the compression accelerator card according to the decompression identifier set by the application, and returning the compressed data cached in the compression accelerator card to the application by the virtual compression hard disk without decompressing the compressed data cached in the compression accelerator card, wherein the compression identifier is added to the write command and sent to the virtual compression hard disk, and the decompression identifier is added to the read command and sent to the virtual compression hard disk, and wherein the compression identifier and the decompression identifier are respectively arranged in a register of the compression accelerator card.

2. The method of claim 1, wherein the hard disk driver is an NVMe driver.

3. The method of claim 1, wherein logical addresses of all input/output interfaces of the compression accelerator card are based on 32K alignment.

4. A method of simulating hard disk mode to access a compression accelerator card based on data intelligent processing technology, comprising:
   inserting the compression accelerator card into a host;
   loading a hard disk driver and an application, not a PCIe adapter driver, and successfully detecting the compression accelerator card as a virtual compression hard disk by the host, the host accessing the compression accelerator card as if accessing a normal hard disk;
   using the application to perform functions of setting a compression identifier and sending a write command to the virtual compression hard disk, and the write command is sent to a compression accelerator card via the virtual compression hard disk, the compression accelerator card is driven by the hard disk driver and detected as the virtual compression hard disk to the host;
   not compressing data by the compression accelerator card according to the compression identifier set by the application and caching previously compressed data within the compression accelerator card, and returning a message to the application;
   using the application to perform functions of setting a decompression identifier and sending a read command to the virtual compression hard disk, the read command is sent to the compression accelerator card via the virtual compression hard disk, wherein a logical address to be read by the read command is a same logical address as was used for the write command; and
   decompressing the previously compressed data according to the decompression identifier by the compression accelerator card, and returning the decompressed data to the application,
   wherein the compression identifier is added to the write command and sent to the virtual compression hard disk, and the decompression identifier is added to the read command and sent to the virtual compression hard disk, and
   wherein the compression identifier and the decompression identifier are respectively arranged in a register of the compression accelerator card.

5. The method of claim 4, wherein the hard disk driver is an NVMe driver.

6. The method of claim 4, wherein logical addresses of all input/output interfaces of the compression accelerator card are based on 32K alignment.

* * * * *